United States Patent
Guelat et al.

(10) Patent No.: US 10,400,580 B2
(45) Date of Patent: Sep. 3, 2019

(54) TEMPERATURE SENSOR TECHNIQUE FOR DETERMINING A WELL FLUID CHARACTERISTIC

(71) Applicant: SCHLUMBERGER TECHNOLOGY CORPORATION, Sugar Land, TX (US)

(72) Inventors: Alain Guelat, Clamart (FR); Celine Gabard-Cuoq, Clamart (FR); Yves Manin, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 274 days.

(21) Appl. No.: 15/202,235

(22) Filed: Jul. 5, 2016

(65) Prior Publication Data

US 2017/0009568 A1      Jan. 12, 2017

(30) Foreign Application Priority Data

Jul. 7, 2015   (EP) .................................... 15290174

(51) Int. Cl.
| | |
|---|---|
| *E21B 47/10* | (2012.01) |
| *E21B 37/06* | (2006.01) |
| *G01K 9/00* | (2006.01) |
| *G01K 3/10* | (2006.01) |
| *G01K 13/02* | (2006.01) |
| *E21B 47/06* | (2012.01) |
| *G01V 9/00* | (2006.01) |
| *G01K 1/02* | (2006.01) |

(52) U.S. Cl.
CPC ............ *E21B 47/065* (2013.01); *E21B 37/06* (2013.01); *E21B 47/1005* (2013.01); *G01K 1/026* (2013.01); *G01K 3/10* (2013.01); *G01K 13/02* (2013.01); *G01V 9/005* (2013.01)

(58) Field of Classification Search
CPC .... E21B 47/06; E21B 47/065; E21B 47/1005; E21B 37/06; G01K 3/10; G01K 1/026; G01K 13/02; G01V 9/005
See application file for complete search history.

(56) References Cited

U.S. PATENT DOCUMENTS

| | | | |
|---|---|---|---|
| 6,880,402 B1 * | 4/2005 | Couet ....................... | B08B 3/12 73/1.49 |
| 8,408,314 B2 * | 4/2013 | Patel ....................... | E21B 37/06 166/306 |
| 8,430,162 B2 * | 4/2013 | Kotsonis ................. | E21B 37/06 166/250.01 |
| 8,788,251 B2 | 7/2014 | Weng et al. | |
| 9,103,199 B2 * | 8/2015 | Lannom .................. | E21B 27/02 |
| 2001/0023614 A1 * | 9/2001 | Tubel ...................... | E21B 23/03 73/152.39 |

(Continued)

*Primary Examiner* — Michael R Wills, III

(57) ABSTRACT

A method of determining changing well characteristics at downhole locations based on changes in detected temperatures by permanently installed downhole sensors. The methods and tools utilized involve the establishing of baseline temperature profiles, for example, at the outset of well operations. The installed sensors may be powered are rechecked on a periodic or continuous basis for substantial deviations to the temperature profiles which are indicative of particular well condition changes such as the depositing of asphaltene or decreases in fluid velocity.

18 Claims, 5 Drawing Sheets

(56) References Cited

U.S. PATENT DOCUMENTS

| | | | |
|---|---|---|---|
| 2007/0234789 A1* | 10/2007 | Glasbergen | E21B 47/065 73/152.55 |
| 2013/0245953 A1 | 9/2013 | Gonzales et al. | |
| 2016/0024915 A1* | 1/2016 | Duchene | E21B 47/06 166/305.1 |
| 2016/0024916 A1* | 1/2016 | De Oliveira | E21B 37/06 166/264 |
| 2016/0115395 A1* | 4/2016 | Rustad | C10G 33/08 700/282 |

* cited by examiner

TEMPERATURE SENSOR TECHNIQUE FOR DETERMINING A WELL FLUID CHARACTERISTIC

CROSS-REFERENCE TO RELATED APPLICATIONS

The present application claims priority to EP Application Serial No. 15290174.0, which was filed on Jul. 7, 2015, and is incorporated herein by reference in its entirety.

BACKGROUND

Field

The present disclosure relates to techniques for completing a reservoir. More particularly, the present disclosure relates to tools and methods for intelligent completions and monitoring systems.

Description of the Related Art

Exploring, drilling and completing hydrocarbon wells are generally complicated, time consuming and ultimately very expensive endeavors. Thus, maximizing recovery is a significant concern in any well operation. Along these lines, over the years, wells have tended to become deeper and deeper, perhaps exceeding 30,000 feet in depth, and of fairly sophisticated architecture to help ensure greater access to the reservoir. Similarly, increased attention has also been paid to monitoring and maintaining the health of such wells. A premium is also placed on maximizing the recovery rate and extending the overall life of the well as much as possible.

Of course, maximizing recovery, the recovery rate and the overall life of the well are dependent on a host of different factors, not the least of which is the condition of the well architecture. For example, most of the well may be defined by a smooth steel casing that is configured for the rapid up hole transfer of hydrocarbons and other fluids from a formation. However, a buildup of irregular occlusive scale, sludge, wax and other debris or "asphaltenes" may occur over time at the inner surface of the casing or tubing and other architecture so as to restrict flow. Such debris may even form over perforations in the casing, screen, or slotted pipe thereby also hampering hydrocarbon flow into the main borehole of the well from the surrounding formation.

In many cases this buildup is a function of pressure. For example, sudden pressure drops at downhole locations near restrictions may be prone to develop asphaltene buildup. Of course, removing such restrictions to avoid buildup and enhance recovery would only compromise the architecture of the well and hamper recovery in a different manner. Further, this would not eliminate all buildup given that even asphaltene may continue to buildup in absence of such restrictions.

As a practical matter, instead of altering well architecture, buildup as described above is dealt with by first detecting the buildup and then performing an interventional application to achieve its removal. For example, over the course of the life of the well logging applications may be run to detect and map out downhole well conditions. This includes running a logging tool through the well to attain and record such conditions, including locations of potential buildup. Once detected, a variety of cleanout techniques may be utilized to remove debris from the well so as to help ensure unobstructed hydrocarbon recovery.

Unfortunately, performing a complete cleanout generally requires shutting down production and proceeding with another intervention. For example, once asphaltene buildup is detected, production is often shut down, followed by the introduction of a solvent such as xylene that fills the well for a couple of days and is then pumped out. This is then followed by re-examining the well condition and resuming production if the buildup has been sufficiently removed by the solvent-based cleanout.

Of course, the interventional cleanout is an expensive undertaking. In fact, even setting aside the equipment, operator and material cost of a cleanout as described above, there is also the expense of shutting down production for days at a time. All in all, restoring the architecture of the well to an optimum buildup-free state may cost the operator several hundred thousand if not a million or more in today's dollars.

Efforts have been undertaken to try and avoid the need for such costly cleanouts. These efforts may focus on preventing buildup and thereby avoiding the need for such an all-encompassing interventional cleanout. For example, to avoid asphaltene buildup in particular, modeling of the well may take place to help estimate a flow rate threshold to stay under and reduce the likelihood of asphaltene deposits. This manner of avoiding sudden pressure drops may be effective, however, it also compromises the ability of the well to produce at a maximum rate. Once more, this technique is employed in a blind fashion. That is, the rate of production is compromised without any direct indication of problematic buildup actually starting to develop.

Similarly, a circulating chemical injection system may be incorporated into the well hardware and employed to deliver a metered amount of chemical mixture on a near continuous basis to help prevent such buildup. However, this requires an added hardware and material expense along with the expense of separating the chemical mixture from production once the well fluids are produced. Further, this again takes place in a largely blind fashion, adding on these expenses without any direct indication of problematic buildup actually starting to develop.

SUMMARY

A method of determining a characteristic of a downhole fluid in a well is detailed herein. The method may include deploying an array of sensors downhole in the well and calibrating each sensor according to its position in the well as well as an initial temperature reading at the sensor. Then, each sensor may be monitored for a temperature change indicative of a change in a velocity of the fluid due to a change in the characteristic of the fluid.

In some embodiments, a sensor system for detecting changes in downhole conditions in a well at an oilfield is disclosed. The sensor system includes a first plurality of permanently installed downhole temperature sensors at a given depth in the well, a second plurality of permanently installed downhole temperature sensors at another depth of the well below the given depth, and a control unit positioned at the oilfield and in communication with the pluralities of sensors for directing powering thereof and obtaining temperature readings therefrom. The system also includes a processor of the control unit for individually analyzing a deviation from a baseline temperature profile for each sensor of the pluralities of sensors for determining a change in a non-temperature based condition in the well However, many modifications are possible without materially departing from the teachings of this disclosure. Accordingly, such modifications are intended to be included within the scope of this disclosure as defined in the claims.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Embodiments are described with reference to certain types of temperature sensor systems and fluid detections. In particular, sensors directed at the detection of asphaltene buildup during hydrocarbon production are utilized. For example, the sensors may be powered up periodically to determine changes in fluid characteristics indicative of asphaltene buildup at given sensors. Of course, the system and techniques may be utilized to examine for changes in other fluid characteristics. Regardless, so long as individual installed powered sensors of the system may be monitored to correlate temperature changes with non-temperature based well characteristic changes, appreciable benefit may be realized.

Figure 1:
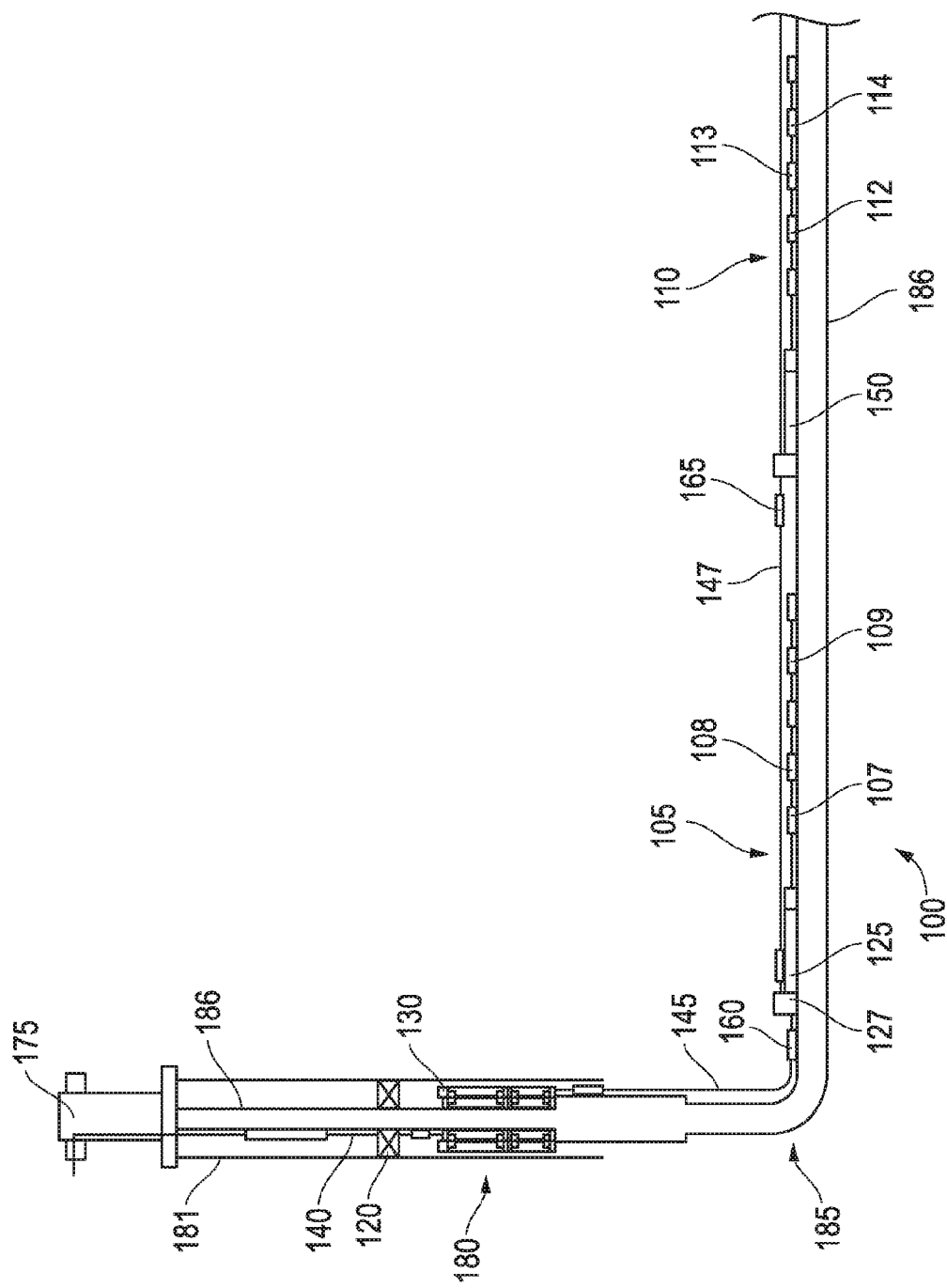
FIG. 1 is a side schematic view of an embodiment of a temperature sensor system incorporated into hardware of a well for establishing downhole fluid characteristics.

Referring specifically now to FIG. 1, a side schematic view of an embodiment of a temperature sensor system 100 is shown incorporated into well hardware for establishing downhole fluid characteristics. In particular, the system is equipped with multiple sensor arrays 105, 110, each including a variety of discrete individual sensors (e.g. 107, 108, 109 and 112, 113, 114, respectively). Each sensor (107-109 and 112-114) may be utilized to measure temperature at its own particular installed location. For example, with added reference to FIG. 2, in the embodiment shown, the arrays 105, 110 are mounted to production tubing 186 at the interior of casing 181 that defines the well 180. Thus, the system 100 is well suited for measuring characteristics of production fluid 225 at each individual sensor (107-109 and 112-114). More specifically, the sensors (107-109 and 112-114) are temperature sensors. Therefore, as detailed further below, changing characteristics of production fluid 225 that may be correlated to changes in temperature may be dynamically monitored over time.

In the embodiment shown, the sensors (107-109 and 112-114) may be permanently installed resistance temperature detectors. Thus, once they are powered up, they may generate a degree of heat on their own. While this heat is likely to rapidly dissipate in most circumstances, changes in downhole fluid characteristics, may emerge that present in the form of changes in the temperature detection profile of the system 100 on a sensor by sensor basis. For example, where production constituents begin to deposit directly on the sensors (107-109 and 112-114), such as in the case of asphaltene buildup, a detectable rise in sensor temperature may result. This rise in temperature may also be correlated to fluid velocity and type, providing additional useful information to operators in a real-time fashion. That is, in contrast to a logging interventional application or passive fiber optic temperature detection, these sensor arrays 105, 110 are permanently installed and powered. As a result, each individual sensor (107-109 and 112-114) is afforded the opportunity to physically allow buildup thereat and generate heat during use that may be affected by such buildup.

Continuing with reference to FIG. 1, the system 100 is shown installed with other hardware such as the tubing 186 and casing 181 as noted above. The particular installation shown utilizes upper 180 and lower 185 completion hardware with a packer 120 providing isolation within the upper completion 180. Thus, the lower completion 185 may be used to target particular production location within a reservoir of a downhole formation 295 (see FIG. 2). A coupler 130 is utilized to allow for effective connections to be made between the upper 180 and lower 185 completion hardware. For example, in the embodiment shown, the sensor arrays 105, 110 are electronically powered by a lower completion line 145. This line 145 is electronically coupled to the upper completion line 140 through the noted coupler 130 and ultimately traverses the well head 175, exiting the system 100 for sake of obtaining power from an external location.

In the embodiment shown, the electrical lower completion line 145 provides power to the first, more up hole, sensor array 105 through a conventional dry mate connection 160 and splits off to an electrical relay line 147 that continues on via another connection 165 for powering the second, more downhole, array 110. Intervening junctions 127 and flux stations 125, 150 may be present for regulating or modulating power and digitizing temperature data, respectively. This particular architecture is representative of how such a system 100 may be utilized for focusing on downhole fluids in an isolated production region of a well 280 (see FIG. 2). Of course, this is but one potential layout for utilization of such a system 100. A variety of different or additional components may be utilized. For example, another such system may be employed for injection wells and fluids (as opposed to being focused on production).

Figure 2:
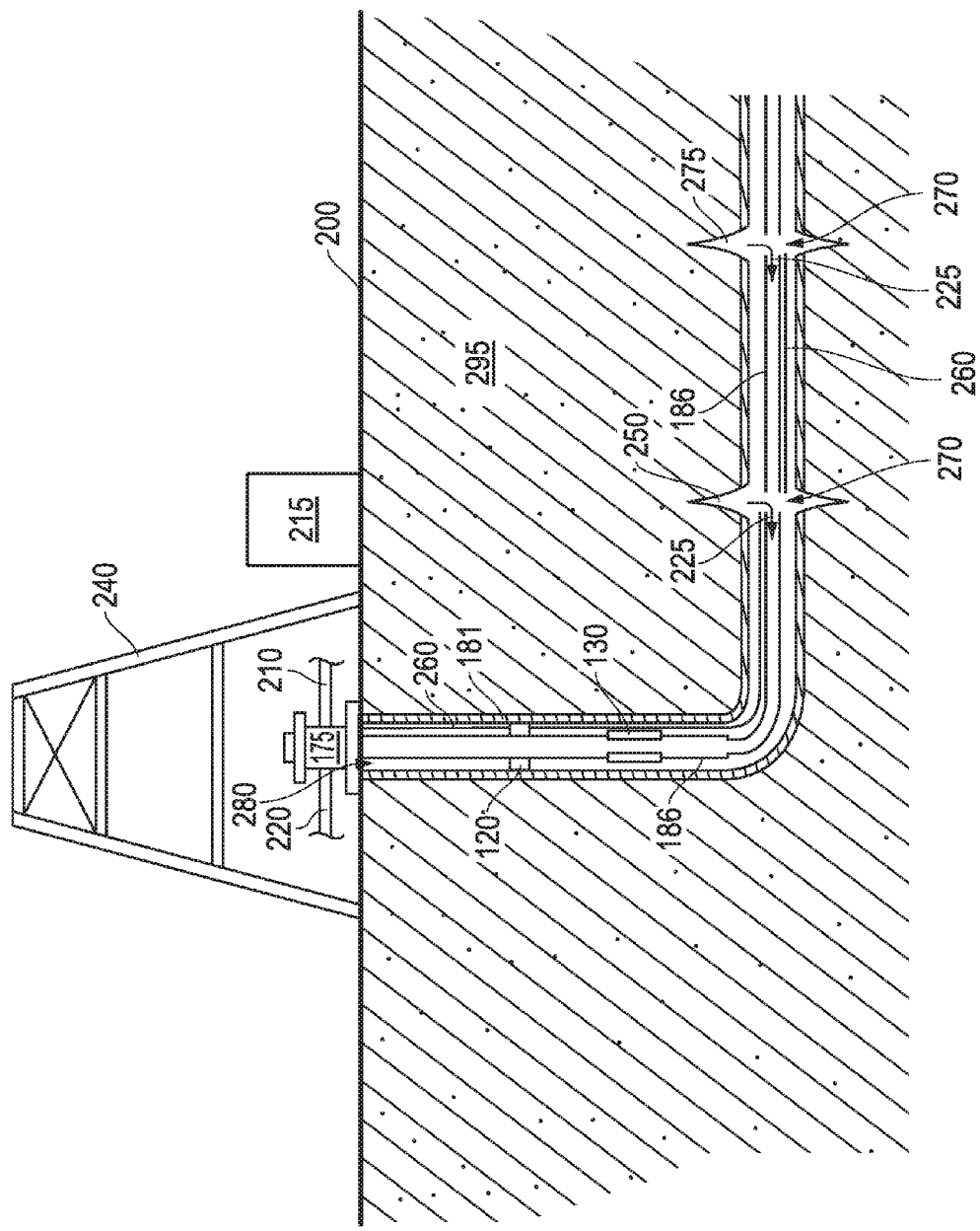
FIG. 2 is an overview of an oilfield with a well accommodating the temperature sensor system of FIG. 1.

Continuing now with reference to FIG. 2, an overview of an oilfield 200 is shown with a well 280 accommodating the temperature sensor system 100 of FIG. 1. In this environment, the usefulness of the system 100 may be better appreciated. For example, in this view, the sensor arrays 105, 110 of the system 100 depicted in FIG. 1, remain, but, for sake of illustration, are out of the field of view. In this manner, the adjacent flow of production fluid 225 from formation perforations 250 is readily apparent. Specifically, the isolated production tubing 186 is provided with inlets 270 that allow for the uptake of production 225 through a channel 285 thereof via the perforated adjacent casing 181.

In the embodiment shown, certain types of surface equipment for managing production is found adjacent the rig 240. Specifically, emerging from the well head 175 are a production pipe 220 and chemical injection pipe 210. Fluid flow through these pipes 220, 210 may be regulated by a control unit 215 in communication with the installed temperature sensor system 100. So, for example, the rate of production 225 from the well 280 may be slowed or chemical injection introduced depending upon analysis performed by a processor of the unit 215 based on the temperature data acquired from the system 100.

Given that certain types of buildup may be pressure related, utilizing the control unit to manage the flow of production in response to system temperature readings may be beneficial. Additionally, as shown in FIG. 2, the chemical injection pipe 210 leads to a chemical injection line 260 that traverses the packer 120 and coupler 130 to reach the production region near the installed system 100. Thus, the control unit 215 may regulate chemical injection as needed to help minimize buildup. Furthermore, because the unit 215 is able to introduce such measures based on real-time analysis of temperature data, not only is the need for a logging intervention avoided, but so too is the need to blindly or prematurely slow production or unnecessarily introduce a chemical mixture. Of course, in order to take advantage of such real time temperature data, monitoring downhole sensor data over time is key.

Figure 3A:
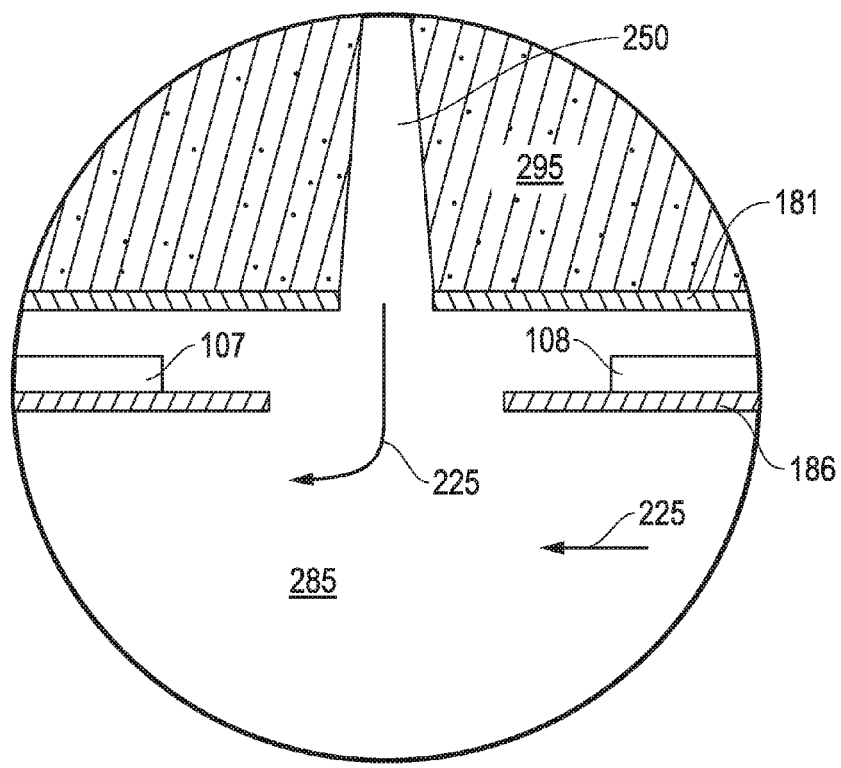
FIG. 3A is an enlarged view of discrete sensors of the sensor system of FIG. 2 during downhole production of a fluid.

Referring now to FIG. 3A, an enlarged view of two discrete sensors 107, 108 of the system of FIG. 2 is shown during downhole production of a fluid 225. In this view, the uptake of fluid 225 from the adjacent perforation 250 is evident. Thus, the depicted sensors 107, 108 are unlikely to detect substantial changes in temperature from one point in time to another. That is, the temperature sensors 107, 108 are adept at detecting changes in the surrounding medium which includes conditions related to the fluid 225. While the well itself may be assumed to be largely steady state in terms of temperature, changes in fluid velocity, buildup on the sensors 107, 108 and other dynamic conditions of the fluid 225 may result in temperature detection changes.

Figure 3B:
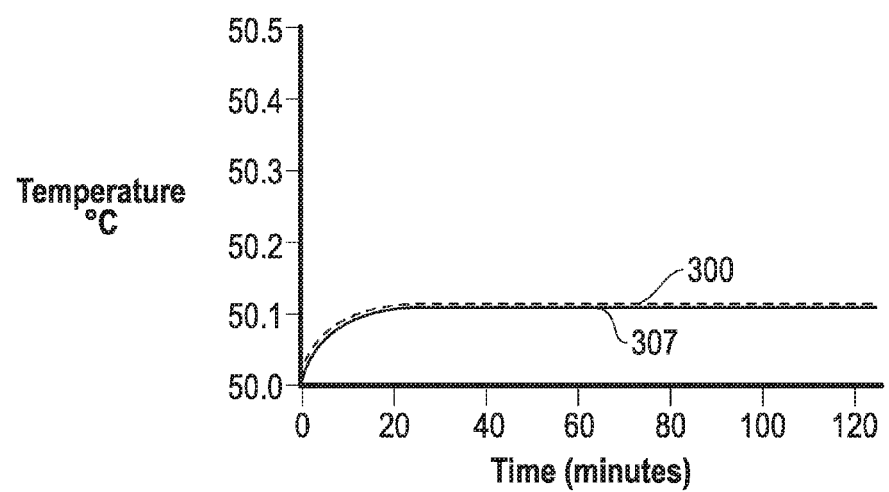
FIG. 3B is a chart plotting temperature of one of the discrete sensors of FIG. 3A over a time where characteristics of the fluid have remained substantially constant.

Referring now to FIG. 3B, a chart is shown plotting the temperature readings obtained from of one of the discrete sensors 107 of FIG. 3A over a time. As indicated above, the characteristics of the producing fluid 225 in FIG. 3A have remained substantially constant over time. So, for example, at the outset of production operations, a baseline 307 for the sensor 107 may be established. In the chart of FIG. 3A, it is apparent that once the powered sensor 107 warms up and begins detection, a stabilized temperature detection of about 50.1° C. is established. Specifically, after about 20 minutes, this baseline 307 may be established.

The powered sensor 307 may remain on or, perhaps more likely, turned off and then powered back up again for monitoring on a daily, hourly or some other periodic basis. Regardless, once the baseline 307 is established, the sensor 107 may again be checked. In the embodiment shown, the sensor 107 is again turned on at a future point in time and a detection (300) monitored. In this case, a time to stabilization of about 20 minutes at about 50.1° C. is again determined. Thus, the sensor 107 has detected no notable change in well fluid characteristics. So, for example, with added reference to FIG. 2, no cause for action by the control unit 215 is apparent.

Figure 4A:
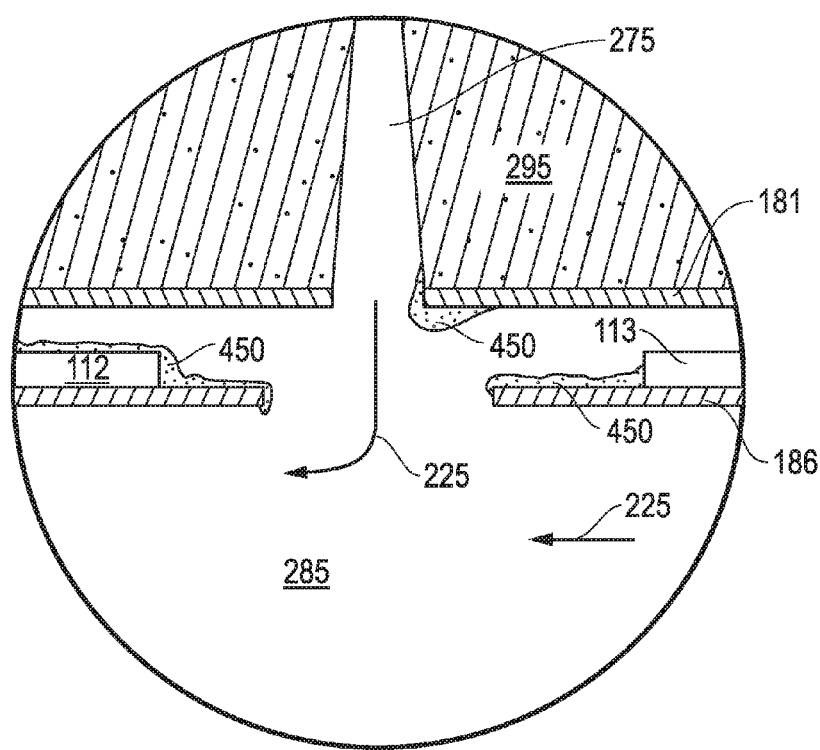
FIG. 4A is an enlarged view of other discrete sensors of the sensor system of FIG. 2 during downhole production of the fluid.

Referring now to FIG. 4A, an enlarged view of other discrete sensors 112, 113 at another location in the well 280 are shown (see FIG. 2). In contrast to the sensors 107, 108, however, these sensors 112, 113 have experienced some surrounding buildup 450 from the fluid 225. More specifically, in the embodiment shown, this buildup 450 is asphaltene deposited at various locations of the production region, including right on the sensors 112, 113. As a result, temperature readings from these sensors 112, 113 may now differ from baseline readings established at the outset of production operations as described below.

Figure 4B:
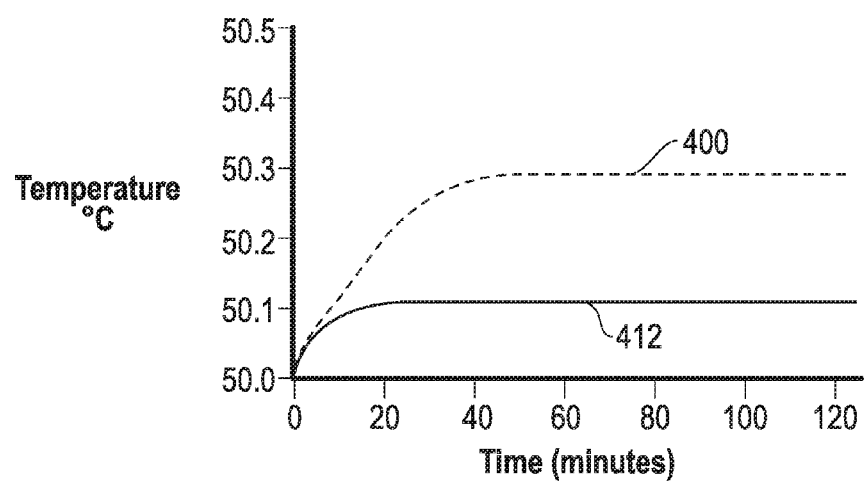
FIG. 4B is a chart plotting temperature of one of the discrete sensors of FIG. 4A over a time where characteristics of the fluid have substantially changed.

Referring now to FIG. 4B, a chart plotting temperature of one of the discrete sensors 112 of FIG. 4A over a time is shown. However, unlike the chart of FIG. 3B, conditions surrounding this sensor 112 have substantially changed. More specifically, a baseline 412 for the sensor 112 is established at the outset of production operations. Though the location in the well for this sensor 112 is below that of the sensor 107 of FIG. 3A, the baseline 412 is largely the same. That is, after about 20 minutes, a stabilized temperature reading of about 50.1° C. is established for the sensor 112. However, when these readings are taken again in the future after the buildup 450 of FIG. 4A has emerged, the results are quite different.

Unlike the baseline 412, once a sensor 112 with buildup 450 is turned back on, a different type of detection (400) emerges. Specifically, as shown in FIG. 4B, the sensor 112 warms up and, after 20 minutes, does not stabilize in temperature. Instead, the insulating layer of buildup 450 causes the detected temperature to continue to rise until at about 40 minutes, a stabilized temperature of about 50.3 degrees is attained. In this circumstance, the delay in reaching the stabilized temperature as well as the higher temperature, in comparison to the baseline 412 are both real-time indicators that changes have occurred downhole. Pre-stored profile information at the control unit 215 of FIG. 2 may be referenced to establish the particular meaning of the change in detection 400. For example, a particular temperature rise and increase in time to stabilization may correspond to a particular fluid velocity as described further below. This, in turn may correspond to a degree of asphaltene buildup in millimeters as previously established and stored at the unit 215.

Parameters or guidelines for when to take corrective action such as reducing production flow, introducing chemical injection, or taking some other corrective measure may or may not be set in advance of operations. For example, the change may be considered substantial enough to warrant action in situations where the time to temperature stabilization has increased by 50% in combination with a temperature increase of more than 1/10 of a ° C. Of course, these are only exemplary parameters. Further, the type and degree of corrective action may also differ depending on the magnitude of the changes represented in the detection 400. For example, a minor reduction in production rate may initially be sought which is later further reduced should the magnitude of the change in detection 400 increase further. Along the same lines, the corrective action and determination as to whether or not such action should be taken may depend on the type of operations, stage of life of the well, and other operational considerations. For example, detections 400 as shown in FIG. 4B may have vastly different implications on an older injection well slated to be taken off-line in the near future in contrast to a production well as depicted in FIG. 2. Nevertheless, in either circumstance, the operator is provided with real-time fluid condition information from permanently installed downhole powered sensors (e.g. 112, 113 and others).

While the above examples reveal the correlation between detected temperature changes and the particular circumstance of asphaltene buildup, it is worth noting that changes in detection may be indicative of a variety of characteristics of downhole fluid conditions. For example, a rise in temperature may be indicative of a lowering of fluid velocity. By way of specific example, in the chart of FIG. 4B, the raise in temperature from the baseline 412 to the current detection 400 may translate to a shift from about 0.01 meters per second (m/s) to about 0.0005 m/s. Of course, this is only exemplary as a variety of other fluid characteristic information may be ascertained by monitoring such changes in detection 400, particularly when combined with other real-time available information, such as pressure.

Figure 5:
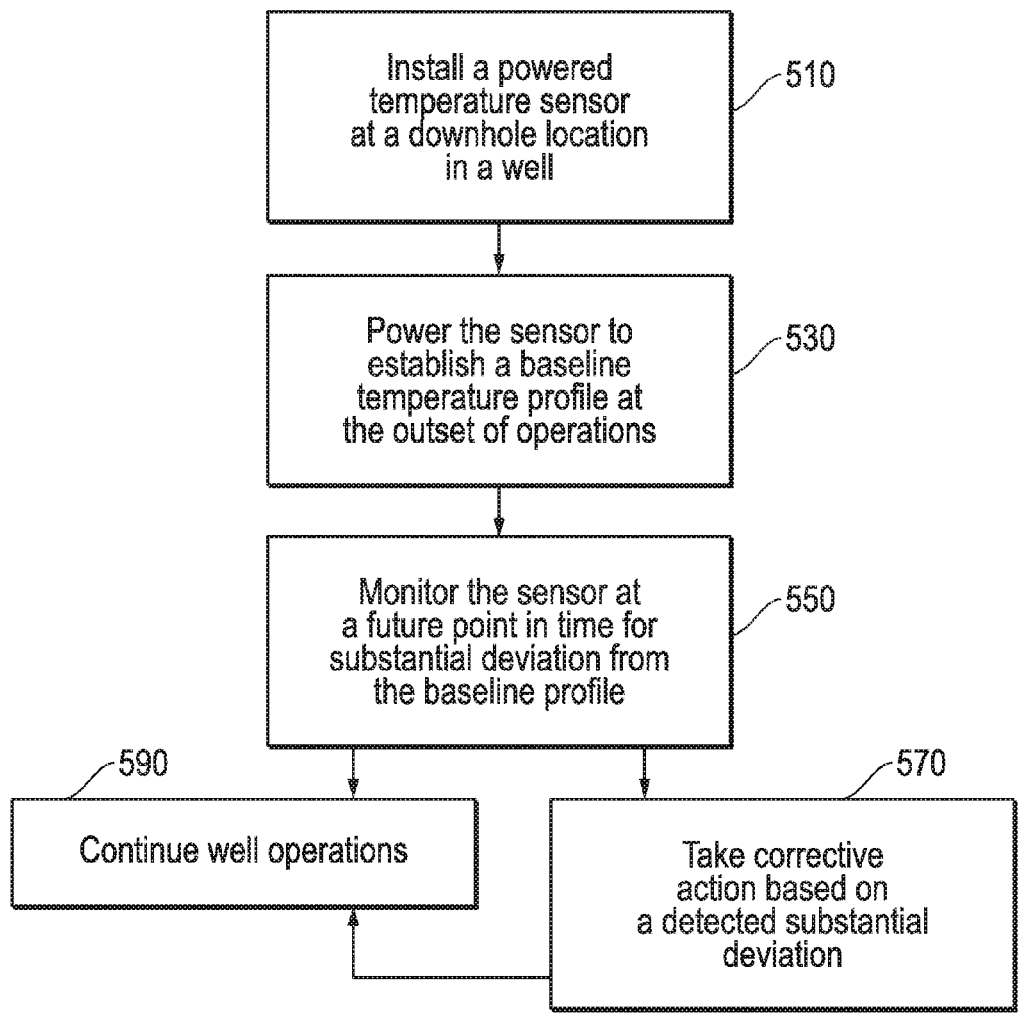
FIG. 5 is a flow-chart summarizing an embodiment of utilizing a temperature sensor system to monitor for downhole fluid characteristic changes.

Referring now to FIG. 5, a flow-chart summarizing an embodiment of utilizing a temperature sensor system to monitor for downhole fluid characteristic changes is shown. As indicated at 510, the system includes at least one sensor installed at a downhole location. The sensor may then be powered to establish a baseline temperature profile at the outset of operations (see 530). Thus, periodically, the sensor may be monitored in the future for substantial deviations from the baseline profile as indicated at 550. This may be achieved by monitoring the sensor on a continuous basis or by periodically powering the sensor on to check for such deviations at predetermined intervals. With such dynamic fluid characteristic information in hand derived from these types of temperature comparisons, the operator may continue well operations (see 590) or take corrective action as needed (see 570). For example, a substantial temperature profile deviation may be indicative of asphaltene buildup or other condition warranting corrective action. Regardless, the operator is provided with real-time information that may allow operations to ultimately continue (see 590) even if intervening corrective action is warranted, for example, based on stored predetermined parameters.

Embodiments described hereinabove include techniques that may avoid costly intervention for the sake of logging well conditions and/or follow-on costly cleanouts. Furthermore, with real-time fluid characteristic and buildup information available, premature corrective action such as reducing flow-rate and/or unnecessary chemical injection may be avoided. So, for example, production need not be prematurely hampered or blindly contaminated with chemical injection fluid.

Persons skilled in the art and technology to which these embodiments pertain will appreciate that alterations and changes in the described structures and methods of operation may be practiced without meaningfully departing from the principle, and scope of these embodiments. For example, while the techniques herein focus on the detection of asphaltene buildup, other fluid changes or velocity determinations may be established with such techniques, such as gas detection or the emergence of water breakthrough in a hydrocarbon well.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A method of monitoring a downhole well condition, the method comprising:
   installing a temperature sensor at a downhole location in the well;
   powering the sensor;
   calibrating the sensor to establish a baseline temperature profile over a predetermined period of time;
   detecting a substantial deviation in the form of both a delay in reaching a stabilized temperature and a rise in temperature relative to the baseline temperature profile;
   correlating the substantial deviation with a buildup of material directly on the sensor; and
   taking corrective action in the well based on the correlating of the substantial deviation with the buildup.

2. The method of claim 1 wherein the taking of the corrective action comprises one of introducing a chemical injection mix to the location of the sensor and reducing the rate of fluid flow in the well.

3. The method of claim 1 wherein the buildup on the sensor is a buildup of asphaltene.

4. The method of claim 1 further comprising:
   performing an application in the well prior to the detecting of the substantial deviation; and
   continuing the application in the well after the taking of the corrective action.

5. The method of claim 4 wherein the application is one of producing fluid from the well and injecting fluid into the well.

6. The method of claim 1 further comprising:
   turning off the sensor after the calibrating; and
   turning on the sensor before the detecting.

7. A sensor system for detecting changes in downhole conditions in a well at an oilfield, the system comprising:
   a first plurality of permanently installed downhole temperature sensors at a given depth in the well;
   a second plurality of permanently installed downhole temperature sensors at another depth of the well below the given depth, the first plurality of permanently installed downhole temperature sensors and the second plurality of permanently installed downhole temperature sensors comprising resistance temperature detectors which generate heat when powered up;
   a control unit positioned at the oilfield and in communication with the pluralities of sensors for directing powering thereof and obtaining temperature readings therefrom, the control unit storing a baseline temperature profile including an initial stabilized temperature reached over a given period of time for each sensor of the pluralities of sensors; and
   a processor of the control unit for individually analyzing a deviation from the baseline temperature profile based on both an increase in time, relative to the given period of time, for stabilization of temperature and an increase in measured temperature relative to the initial stabilized temperature.

8. The sensor system of claim 7 further comprising chemical injection hardware for delivery of a chemical injection mix to address the determined change in condition.

9. The sensor system of claim 7 further comprising:
a casing to define the well; and
production tubing for conveyance of production fluids through the well, the production tubing to accommodate the pluralities of sensors, the condition correlating to the production fluids.

10. The sensor system of claim 9 wherein the condition is one of buildup at a sensor from production fluids and flow velocity of the production fluids.

11. A method of monitoring a downhole well condition, the method comprising:
installing a plurality of temperature sensors at downhole locations in the well;
powering the temperature sensors of the plurality of temperature sensors;
calibrating the temperature sensors to establish a baseline temperature profile over a predetermined period of time for each temperature sensor;
turning off power to the plurality of temperature sensors;
periodically repowering the temperature sensors of the plurality of temperature sensors;
during each repowering of the temperature sensors, individually monitoring the temperature sensors to detect deviation from the baseline temperature profile in the form of both an increase in time for reaching a stabilized temperature and an increase in the stabilized temperature relative to temperatures in the baseline temperature profile;
upon detection of the deviation, correlating the deviation with a specific condition in the well; and
taking corrective action in the well based on the specific condition.

12. The method of claim 11 wherein taking corrective action comprises injecting a chemical mix to the location of the sensor experiencing the deviation.

13. The method of claim 11 wherein correlating the deviation with the specific condition comprises correlating the deviation with buildup of material directly on the sensor experiencing the deviation.

14. The method of claim 11 wherein correlating the deviation with the specific condition comprises correlating the deviation with a decrease in fluid velocity in the well adjacent the sensor experiencing the deviation.

15. The method of claim 13 wherein correlating the deviation with buildup comprises correlating the deviation with a buildup of asphaltene.

16. The method of claim 11 further comprising producing well fluid from the well.

17. The method of claim 11 further comprising injecting fluid into the well.

18. The method of claim 11 wherein installing the plurality of temperature sensors comprises permanently installing different groups of sensors at different depths in the well.

* * * * *